United States Patent
Vasilyev et al.

(10) Patent No.: US 6,643,057 B2
(45) Date of Patent: Nov. 4, 2003

(54) OPTICAL AMPLIFIER WITH REDUCED NON-LINEAR SIGNAL IMPAIRMENTS BY OPTIMUM PUMPING CONFIGURATION AND METHOD FOR USING SAME

(75) Inventors: Michael Vasilyev, Belle Mead, NJ (US); Sergio Tsuda, North Brunswick, NJ (US); Gregory G. Luther, Corning, NY (US); Yongqian Liu, Plano, TX (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 09/793,861

(22) Filed: Feb. 26, 2001

(65) Prior Publication Data

US 2002/0154389 A1 Oct. 24, 2002

(51) Int. Cl.[7] ............................................. H04B 10/12
(52) U.S. Cl. ................. 359/341.3; 359/337; 359/337.1; 359/341.32
(58) Field of Search ......................... 359/337, 337.1, 359/341.1, 341.3, 341.32, 333

(56) References Cited

U.S. PATENT DOCUMENTS

| | | | | |
|---|---|---|---|---|
| 5,392,153 A | * | 2/1995 | Delavaux | 359/341.3 |
| 5,457,568 A | | 10/1995 | Jacobovitz-Veselka et al. | 359/341 |
| 5,623,362 A | * | 4/1997 | Mitsuda et al. | 359/134 |
| 5,710,659 A | * | 1/1998 | Cline | 359/337 |
| 5,742,427 A | * | 4/1998 | Kakui et al. | 359/134 |
| 5,933,552 A | * | 8/1999 | Fukushima et al. | 359/130 |
| 6,055,092 A | * | 4/2000 | Sugaya et al. | 359/134 |
| 6,201,637 B1 | * | 3/2001 | Nilsson et al. | 359/169 |
| 6,263,139 B1 | * | 7/2001 | Kawakami et al. | 359/161 |
| 6,342,965 B1 | * | 1/2002 | Kinoshita | 359/124 |

FOREIGN PATENT DOCUMENTS

EP    0 621 663 A1    4/1993    ............. H01S/3/06

OTHER PUBLICATIONS

Karasek. IEE Proc.–Optoelectron. vol. 146 No. 3 Nov. 1999.*
Liu et al. Electronics Letters vol. 35 No. 24 Nov. 1999.*
Liu et al. OFCC vol. 2 Mar. 2000.*
Mahdi et al. IEEE Phot. Tech. letts. vol. 12 No. 11, Nov. 2000.*
Jinno et al. IEEE Phot. Tech. Letts. vol. 10 No. 3, Mar. 1998.*
Pedersen et al. Journal of Lightwave Tech. vol. 9 No. 9, Sep. 1991.*
Chung et al. Elec. Letts. vol. 35 No. 13, Jun. 1999.*
Espindola et al. Elec. Letts.Vol3336, No. 15, Jul. 2000.*
Spirit et al. Elect. Letts. vol. 28 No. 9, Apr. 1992.*
Kurokawa et al. IEEE Journal of Quantum Electronics. vol. 28 No. 9. Sep. 1992.*

(List continued on next page.)

Primary Examiner—Thomas G. Black
Assistant Examiner—Stephen Cunningham
(74) Attorney, Agent, or Firm—Price, Heneveld, Cooper, DeWitt & Litton (57) ABSTRACT

A system and method for amplifying an optical signal within an optical waveguide amplifier including providing at least one optical waveguide amplifier having an input for receiving an optical source signal therein and an output, wherein a forward pumping direction extends from the input to the output and rearward pumping direction extends from the output to the input. The system also includes providing at least one excitation light source in optical communication with the optical waveguide amplifier and capable of generating at least one excitation light. The system further includes amplifying the source signal by pumping a first excitation light from the excitation light source in the rearward pumping direction, and amplifying the source signal by simultaneously pumping a second excitation light from the excitation light source in the forward direction.

43 Claims, 4 Drawing Sheets

OTHER PUBLICATIONS

Masuda et al. Elec. Letts. vol. 33 No. 9 Apr. 1997.*
Masuda et al. Elec. Latts. vol. 26 No. 10, May 1990.*
Chen et al. Elec. Letts. vol. 32 No. 23, Nov. 1996.*
Yu et al. IEE Proc. Optoelectron., vol. 146, No. 3, Jun. 1999.*
"Effects of SPM, XPM, and Four–Wave–Mixing in L–Band EDFAs on Fiber–Optic Signal Transmission", Song, Kai, IEEE Photonics Technology Letters, vol. 12, No. 12, Dec. 2000, p. 1630–1632.

Radic et al, "Signal Impairment due to Four–Wave Mixing in L–band EDFAs," European Conference on Optical Communication, 1999, paper PD1–11.
Radic et al, "Four–wave mixing in quasdistributed optical amplifiers: system implications," Conference on Optical Amplifiers and their Applications, 2000, Paper OMD 19–1.
Eiselt et al, "Measurements of Cross–phase modulation induced crosstalk in an L–band EDFA," OFC'99, 34, ThC1–1.

* cited by examiner

OPTICAL AMPLIFIER WITH REDUCED NON-LINEAR SIGNAL IMPAIRMENTS BY OPTIMUM PUMPING CONFIGURATION AND METHOD FOR USING SAME

BACKGROUND OF THE INVENTION

1. Field of the Invention

The invention is directed to an optical waveguide amplifier for use in telecommunication systems and more particularly, a waveguide optical amplifier that reduces nonlinear signal impairments within the optical amplifier.

2. Technical Background

The continuous growth of bandwidth requirements in optical-based communication systems has resulted in a large demand for systems able to operate within several optical wavelength ranges including the S-band optical range, the C-band optical range and the L-band optical range. The S-band is defined as the wavelengths between about 1465 nm and about 1525 nm, which lies below the C-band wavelength range which extends between about 1525 nm and about 1560 nm, which in turn lies just below the L-band wavelength range which extends between about 1560 nm and about 1610 nm. In order to create a viable operating bandwidth, a large bandwidth must be obtained within each of the operating wavelength ranges. Currently, most telecommunications systems utilize the C-band and L-band ranges.

The growth of bandwidth requirements has also resulted in a demand for higher data rates in optical communication systems resulting in higher optical powers propagating within the optical fibers associated with the communication systems. Specifically, optical amplifier technology and wavelength division multiplexing techniques are typically required in numerous telecommunication systems, such as those systems that require high-power transmissions for long distances, as well as dense wavelength-division multiplexing technology (DWDM) used in metropolitan area networks.

With respect to high-power transmissions for long distances, the definition of high-power and long distances is meaningful only in the context of a particular telecommunication system wherein a bit rate, a bit error rate, a multiplexing scheme, and optical amplifiers are specified. There are additional factors, known to those skilled in the art, which have impacted upon the meaning of high power and long distance, however, for most purposes, high power is a total optical power greater than about 10 mW or single channel power of greater than 1 mW. In some applications, optical amplifiers with single channel power levels of 1 mW or less are also sensitive to non-linear effects. A long distance is one in which the distance between electronic regenerators can be in excess of 100 km. The regenerators are to be distinguished from repeaters which make use of optical amplifiers. Repeater spacing, especially in high data density systems, can be less than half the regenerator spacing.

Several problems are associated with utilizing higher optical powers to propagate signals in optical fibers, including less tolerance for nonlinear-optical impairments associated with such propagations. In addition, the expansion of wave division multiplexing technology into the L-band frequency range has highlighted the problems associated with these nonlinear effects within erbium-doped fiber amplifiers (EDFAs). These nonlinear-optical impairments may become the dominant signal degradation factor of the EDFAs.

Of the nonlinear-optical impairments associated with the amplification of high-power optical signals within EDFAs, the most notable nonlinear-optical impairments include four-wave mixing, cross-phase modulation, and self-phase modulation. Four-wave mixing occurs when two or more frequencies of light propagate through an optical waveguide fiber together, and phase-matching occurs between the light signals. Light is then generated at new frequencies using optical power from the original signals. Cross-phase modulation occurs between two waves having different frequencies and similar polarizations or the same frequencies but different polarizations. Self-phase modulation is a temporal analog of self-focusing within an optical waveguide fiber, and results in spectral broadening of optical pulses.

The problem of optically amplifying optical signals within the L-band range, while minimizing noise generated during amplification and while simultaneously minimizing the amount of nonlinear impairments introduced into the signal, is critical to amplifier design.

A solution is needed, therefore, which allows for the amplification of an optical signal while simultaneously minimizing nonlinear-optical impairments and optimizing the optical signal-to-noise ratio developed within the associated optical amplifier.

SUMMARY OF THE INVENTION

One aspect of the present invention is to provide a method for amplifying an optical signal within an optical waveguide amplifier, including providing at least one optical waveguide amplifier having an input for receiving an optical source signal therein, and an output, wherein a forward pumping direction extends from the input to the output and rearward pumping direction extends from the output to the input. The method also includes providing at least one excitation light source in optical communication with the optical waveguide amplifier and capable of generating at least one excitation light. The method further includes amplifying the source signal by pumping a first excitation light from the excitation light source in the rearward pumping direction, and amplifying the source signal by pumping a second excitation light from the excitation light source in the forward direction simultaneous with pumping the first excitation light source.

According to one embodiment of the present invention an optical waveguide amplifier comprises at least one gain producing optical waveguide having an input for receiving an optical source signal therein and an output. The optical waveguide amplifier has a forward pumping direction that extends from the input to the output and a rearward pumping direction that extends from the output to the input. The optical amplifier further includes at least one excitation light source in optical communication with the optical waveguide, the excitation light source generating at least one excitation light. The source signal is amplified by pumping (i) a first excitation light from the excitation light source into the optical waveguide amplifier in the rearward pumping direction, and (ii) a second excitation light from the excitation light source into the optical waveguide amplifier in the forward direction. Finally, the optical amplifier is configured to satisfy the following equations: $|\Delta OSNR|<0.4$ dB and $FWMX \leq -25$ dB, where OSNR stands for signal to noise ratio and, FWMX is four wave mixing cross talk.

According to an embodiment of the present invention an optical fiber communications system comprises: a transmitter; a receiver; at least one optical waveguide amplifier having (i) an input in optical communication with the optical waveguide amplifier for receiving the source signal and (ii)

an output in optical communication with the receiver for delivering the source signal to the receiver. The optical waveguide amplifier has a forward pumping direction that extends from the input to the output and a rearward pumping direction that extends from the output to the input. The optical communication system further includes at least one excitation light source in optical communication with the optical waveguide amplifier, the excitation light source generating at least one excitation light. The source signal is amplified by pumping (i) a first excitation light from the excitation light source into the optical waveguide amplifier in the rearward pumping direction, and (ii) a second excitation light from the excitation light source into the optical waveguide amplifier in the forward direction, wherein $$1.5 < \frac{P_r}{P_f} < 12$$

and FWMX<−30 dB, where $P_r$ is rearwardly propagating pump power, $P_f$ is forward propagating pump power, and FWMX is four wave mixing cross talk.

In addition, the details of embodiments of an apparatus capable of utilizing the above-referenced method and telecommunication systems capable of utilizing the same are disclosed and described herein.

Reference will now be made in detail to the present preferred embodiments of the invention, examples of which are illustrated in the accompanying drawings.

DETAILED DESCRIPTION OF THE PREFERRED EMBODIMENTS

Additional features and advantages of the invention will be set forth in the detailed description which follows and will be apparent to those skilled in the art from the description or recognized by practicing the invention as described in the description which follows together with the claims and appended drawings.

It is to be understood that the foregoing description is only exemplary of the invention and is intended to provide an overview for the understanding of the nature and character of the invention as it is defined in the claims. The accompanying drawings are included to provide a further understanding of the invention and are incorporated and constitute part of this specification. The drawings illustrate various features and embodiments of the invention which, together with their description, serve to explain the principles and operation of the invention.

Definitions

The following terminology and definitions are commonly used in the art. The power of an optical signal propagating through an optical amplifier is generally defined as:

$$P^{sig}(z) = P_{in}^{sig} \times G(z),$$

wherein $P^{sig}(z)$ is the power of the optical signal at a distance z measured from the input point of the optical amplifier, $P_{in}^{sig}$ is the power of the optical signal at the input point of the optical amplifier, and the G(z) is the gain of the source signal within the optical amplifier, at a distance z measured from the input point of the optical amplifier. The measure of cross-phase modulation (or cross-talk) is generally defined as:

$$X_{talk} = \frac{P^{FWM}}{P_{out}^{sig}} = K \left[ P_{in}^{sig} \int G(z) dz \right]^2,$$

wherein $P^{FWM}$=the power of the four-wave mixing effects, $P_{out}^{sig}$ is the power of the source signal after amplification within the optical amplifier as measured at the output point of the optical amplifier, K is a proportionality constant in absence of dispersion, $P_{in}^{sig}$ is the power of the source signal as measured at the input point of the optical amplifier, G(z) is the gain of the signal within the optical amplifier at a distance from the input point of the optical amplifier, and wherein the integration limits are 0 to L, wherein L is the length of the optical amplifier.

Figure 1A:
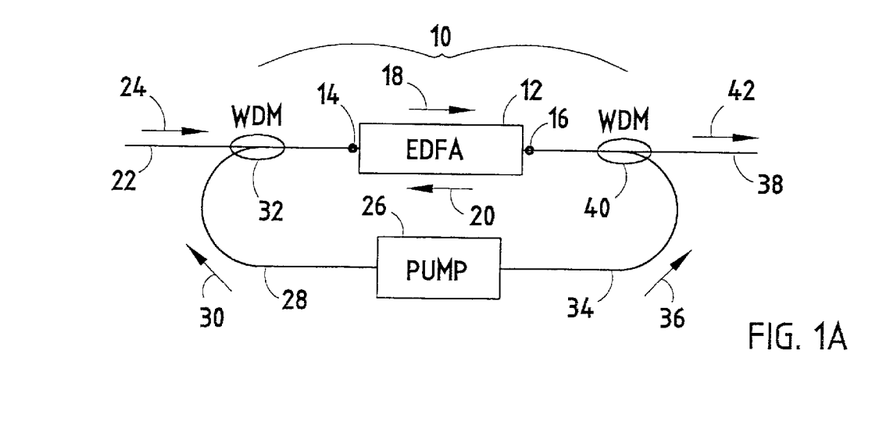
FIG. 1A is a schematic diagram of an optical waveguide amplifier including an optical waveguide fiber amplifier and an excitation light source.
Figure 1B:
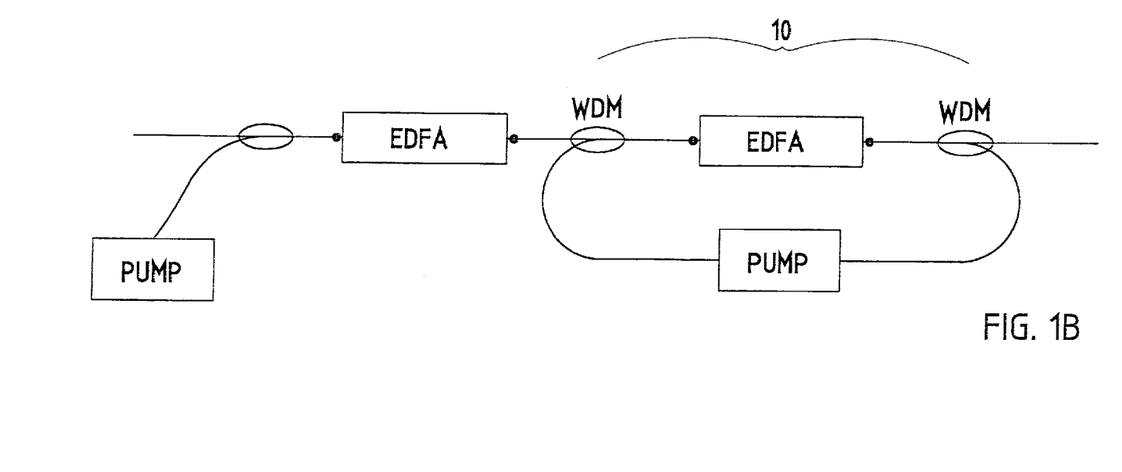
FIG. 1B is a schematic illustration illustrating two concatenated erbium doped fiber amplifiers.

Referring initially to FIG. 1A there is shown an optical waveguide amplifier 10 embodying the present invention. Such an optical amplifier may be used alone or in series with another amplifier, for example as a pre-amp or a booster amp. This is shown, for example, in FIG. 1B. The exemplary optical waveguide amplifier 10 includes an erbium-doped optical waveguide fiber amplifier 12, having an input 14 for receiving an optical signal and pump radiation, and an output 16 for transmitting an amplified optical signal and receiving pump radiation. The exemplary erbium-doped fiber amplifier 12 defines a forward pump direction indicated by an arrow 18 that extends from input 14 to output 16, and a rearward pumping direction indicated by an arrow 20 that extends from output 16 to input 14. The optical source signal is amplified by pump radiation traveling in the forward pumping direction 18 and pump radiation traveling in the rearward pumping direction 20, thereby minimizing both non-linear optical impairments and maximizing the optical signal-to-noise ratio.

In the illustrated example, an input waveguide optical fiber 22 guides the optical signal traveling in the direction indicated by an arrow 24 to input 14 of erbium-doped fiber amplifier 12. As illustrated, fiber amplifier 12 is doped with erbium, however, other dopants known for use within optical amplifiers, such as rare earth elements, may be utilized. Further, in the present example, fiber amplifier 12 is provided in coiled form, however, such a configuration is not required for the systems and methods disclosed herein to be utilized and accomplished. An optical laser pump 26 generates a forward propagating pump radiation through the first coupling optical fiber 28 in a direction indicated by an arrow 30. As illustrated, pump 26 includes a semiconductor diode laser, however, a Raman laser or other laser emitting device may be substituted. The first coupling optical fiber 28 is coupled to input waveguide optical fiber 22 via a first wavelength division multiplexer 32. The optical laser pump 26 also generates rearward propagating pump radiation within a second coupling optical fiber 34 in the rearward direction indicated by arrow 36 which is coupled to an output waveguide optical fiber 38 via an output wavelength division multiplexer 40. Although in the illustrated example several wavelength division multiplexers are used for coupling signals to optical waveguide amplifier 10, any coupler capable of dividing and combining optical signals of varying wavelengths may be used. The output waveguide fiber 38 receives an amplified signal from fiber amplifier 12 traveling in a direction indicated by an arrow 42.

Figure 2:
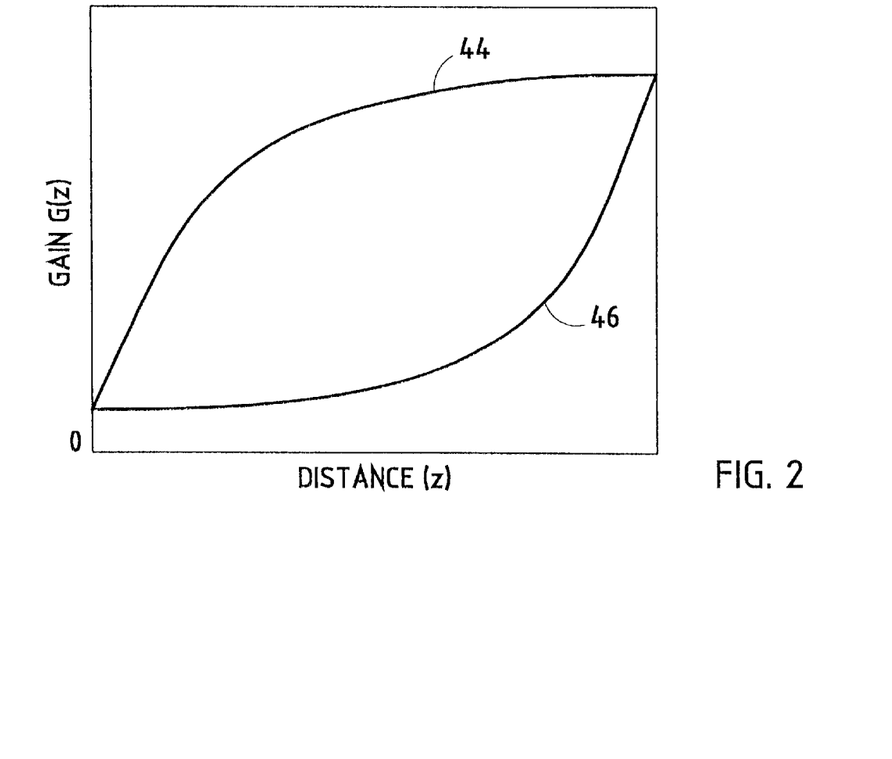
FIG. 2 is a graph of gain versus distance for an optical amplifier experiencing forward or rearward pumping.

In operation, optical pump laser 26 generates both the forward propagating pump radiation 30 and the rearward propagating pump radiation 36 simultaneously, thereby amplifying the source signal 24 within the erbium doped fiber amplifier 12 with both the forward propagating pump radiation 30 and the rearward propagating pump radiation 36. This approach reduces the nonlinear optical impairments created within the fiber amplifier 12 by reducing the amount of the forward propagating pump radiation 30 required to obtain a given gain level. Specifically, when dispersion effects are neglected in a "back-of-the-envelope approximation," the amount of nonlinear optical impairment generated within fiber amplifier 12 is related to the integral of the signal power over the amplifier's length. When compared to a signal that grows rapidly from the input point 14 of fiber amplifier 12, as illustrated by line 44 of FIG. 2, a signal that grows slower at the front fiber amplifier 12, as illustrated by line 46 of FIG. 2, contributes less to this integral, thereby reducing the level of nonlinear optical impairment being introduced into source signal 24 as it travels through fiber amplifier 12. Therefore, utilization of the rearward propagating pump radiation 36 within fiber amplifier 12 results in a reduction of nonlinear optical impairments (such as cross-talk) within the amplified signal 42. That is, given a constant signal output power from the optical amplifier, utilization of more of rearward propagating pump radiation generally results in less non-linear cross talk (X-talk) due to four wave mixing, for example.

While rearward propagating pump radiation 36 results in a reduction of nonlinear optical impairments, the rearward propagating pump radiation 36 (coupled with not enough of forwardly propagating pump power) is detrimental to the noise-figure performance of fiber amplifier 12, due to under pumping influences along fiber amplifier 12. These under pumping influences typically occur at the furthermost point from which the associated pump radiation is introduced into the association fiber amplifier. Therefore, the method described herein utilizes a combination of rearward propagating pump radiation 36 and forward propagating pump radiation 30 to minimize the nonlinear optical impairments while preserving the gain provided by fiber amplifier 12 and maximizing the optical signal-to-noise ratio. In order to optimize signal to noise ratio while preserving gain (or the output power) the power of the forward propagating pump radiation 30 needs only to be a small fraction of the power of the rearward propagating pump radiation 36 introduced to fiber amplifier 12. More specifically, it is preferred that $1.3 \leq P_r/P_f \leq 20$. It is more preferable that $1.5 \leq P_r/P_f \leq 12$ and, even more preferable that $20 \leq P_r/P_f \leq 10$, where $P_r$ is rearwardly propagating pump power and $P_f$ is forwardly propagating pump power. In one example of the present invention the pump power ratio is $$\frac{P_r}{P_f} = \frac{0.6}{0.4}.$$

In another example the pump power ratio is $$\frac{P_r}{P_f} = \frac{0.9}{0.1}.$$

These ratios resulted in minimum cross-talk and low noise figure (NF) while preserving the operation of the amplifier at a relatively stable level. Since OSNR (optical signal to noise ratio) is inversely proportional to noise figure (NF), small amounts of NF result in higher OSNR values.

Figure 3A:
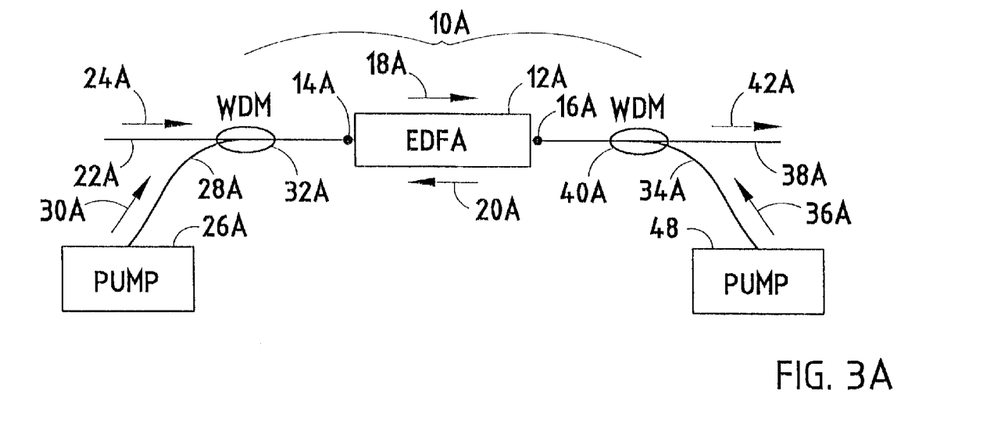
FIG. 3A is a schematic diagram of an alternative embodiment of the optical amplifier of the present invention that includes a second excitation light source.

Another embodiment of the present invention is shown in FIG. 3A, which is an optical waveguide amplifier 10A. Since optical waveguide amplifier 10A is similar to the previously described optical waveguide amplifier 10, similar parts appearing in FIG. 1A and FIG. 3A, respectively, are represented by the same, corresponding reference numerals, except for the suffix "A" in the numerals of the latter. The optical waveguide amplifier 10A includes a second optical laser pump 48 that generates the rearward propagating pump radiation 36A which is introduced into output end 16A of fiber amplifier 12A. The optical waveguide amplifier 10A operates similarly to optical waveguide amplifier 10 as described above, while allowing for fine tuning of the amounts forward and rearward radiation pumping quantities with respect to one another, thereby allowing precise pumping configuration optimization. Again, by optimizing the ratio of pump powers produced by the pumps 26A and 48 the cross-talk and the noise figure NF of the amplifier 10A are optimized. For example, the optimum pump power ratio in the amplifier 10A of this configuration is $$\frac{P_r}{P_f} = \frac{0.6}{0.4},$$

while other exemplary ratios are $$\frac{0.95}{0.05} \text{ and } \frac{0.80}{0.20}.$$

(In the above ratios, $P_r$ and $P_f$ add to a total pump power, $P_{tot}$, where $P_{tot}=P_r+P_f=1$ and $P_{TOT}$ is normalized pump power). Thus, both the cross-talk and the noise figure NF of the amplifier are reduced by optimizing the pump power ratio.

Figure 3B:
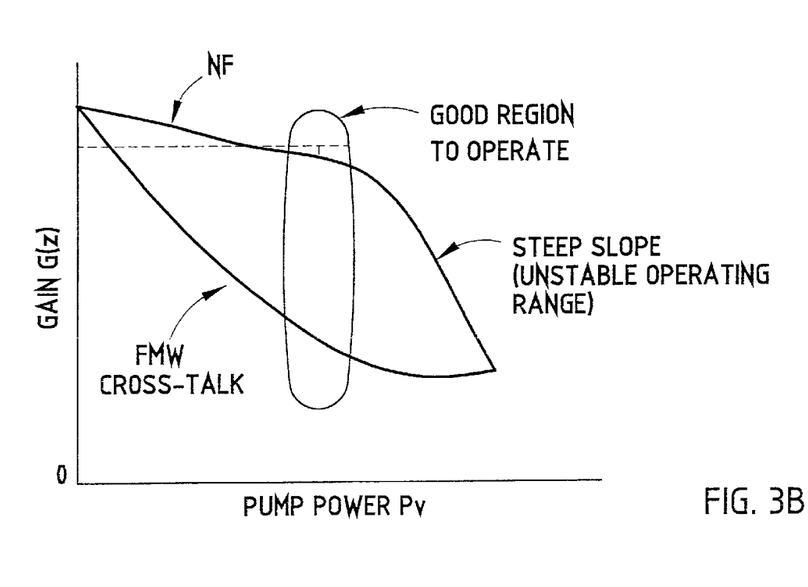
FIG. 3B illustrates schematically the relationship between cross-talk, noise figure and the required rearwardly propagating pump power.

FIG. 3B shows a typical graph of cross-talk (top curve) and a signal to noise ratio OSNR (bottom curve) versus pump power. More specifically, this graph illustrates the amount of pump power provided by pump 48 (which is required to produce the same amount of signal output) and the effect of change in this pump power on the OSNR and cross talk. In order to optimize the pump power ratio, $$\frac{p_r}{p_f},$$

the pump powers should be adjusted until the OSNR begins to fall and the amplifier operates in the region where the OSNR slope is not too steep (i.e., $0 \leq 30°$ and preferably ≦15°) so that there is less than 0.4 dB (and preferably less than 0.2 dB) of OSNR change per 0.1 change in $\Delta P_r$. Thus, it is preferred that the ratio of $\Delta$OSNR to $\Delta P_r$ is between 0 and 2, and in the example of FIG. 3B:

$$0 \leq \frac{\Delta OSNR}{\Delta P_r} \leq \frac{0.2 \text{ dB}}{0.1}, \text{ where } \Delta P_r = \frac{P_{r2} - P_{r1}}{P_{TOT}},$$

and $P_{r2}$, $P_{r1}$ are backward pump powers provided by the pump 48. It is also preferable to operate in the region where cross-talk, for example due to four wave mixing (FWMX) or to cross-phase modulation, is less than −40 dB and preferably less than −50 dB. It is also preferable that $\Delta$OSNR= $|\text{OSNR}_{max}-\text{OSNR}| \leq 0.4$ dB and preferably less than 0.2 dB. $\text{OSNR}_{max}$ is the best achievable OSNR which is typically achieved when all pump power propagates in the forward direction.

Figure 4A:
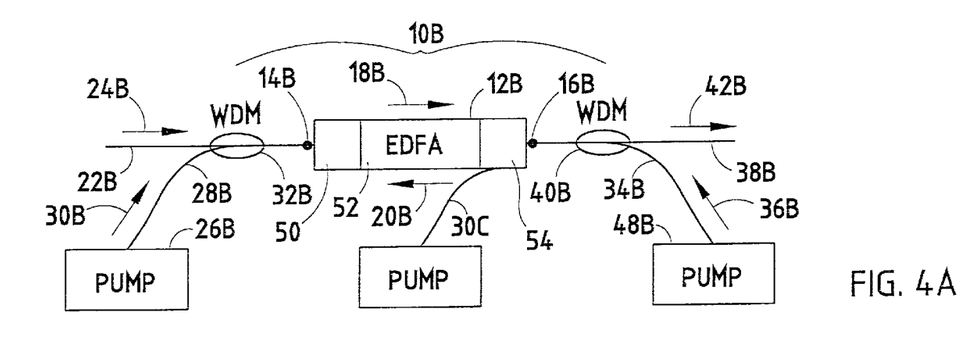
FIG. 4A is a schematic diagram of a second alternative embodiment of the optical amplifier of the present invention that includes multiple, optical waveguide fiber amplifiers.

Another embodiment of the present invention is shown in FIG. 4A, which shows an optical waveguide amplifier 10B. Since optical waveguide amplifier 10B is similar to the previously described optical waveguide amplifier 10A, similar parts appearing in FIG. 3A and FIG. 4A, respectively, are represented by the same, corresponding reference numerals, except for the suffix "B" in the numerals of the latter. The fiber amplifier 12B optical waveguide amplifier 10B is a multi-coil amplifier that includes a plurality of coiled optical waveguide fiber amplifiers including a first optical waveguide fiber amplifier 50, a middle optical waveguide fiber amplifier 52, and a last fiber optical waveguide fiber amplifier 54, connected optically in series with one another. Although in the present example the optical waveguide fiber amplifiers 50, 52, and 54 are provided in coiled form, such a configuration is not required for the methods disclosed herein to be accomplished. Further, two or more optical fibers in optical communication with one another is sufficient for operation of the present embodiment as described below.

Figure 4B:
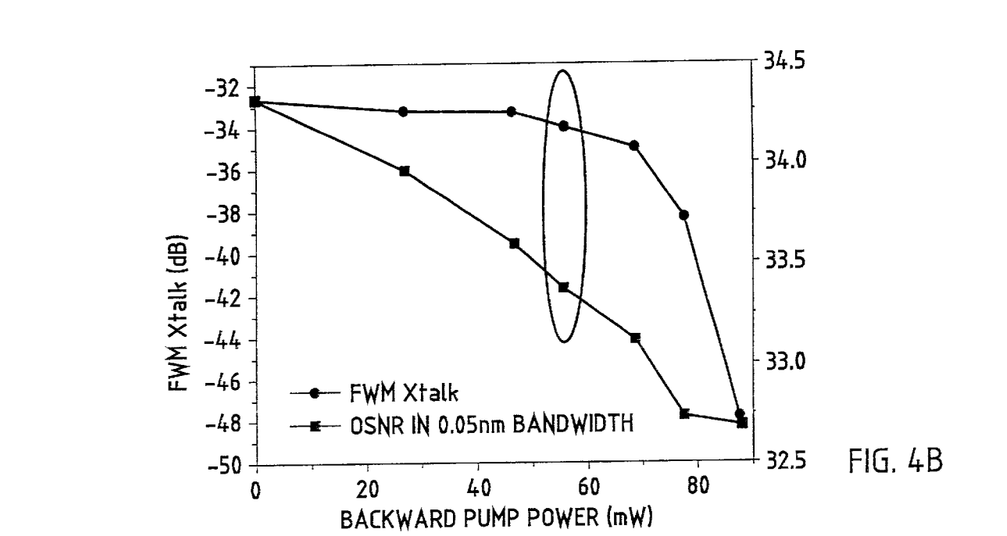
FIG. 4B illustrates systematically the relationship between cross-talk and noise figure and pump power provided by the rearwardly pumping pump of FIG. 4A.

FIG. 4B illustrates the relationship between the cross-talk, OSNR and pump power provided by the pump 48B. The optimum pump power of pump 48B is chosen by considering the trade-off between non-linear cross-talk OSNR penalty that falls within the desirable performance range. In general it is preferred that the pump power provided by the pump be such that the OSNR curve's slope is not too steep. (See FIG. 4*b*)

In operation of the amplifier 10B, the rearward propagating pump radiation 36B is introduced into the last optical waveguide fiber amplifier 54, while the forward propagating pump radiation 30B and additional, optional forward propagating pump radiation 30C is introduced into the first optical waveguide fiber amplifier 50 and the rear optical wave guide amplifier 54, respectively. The optical waveguide amplifier 10B operates under the same principles as described above with respect to optical waveguide amplifier 10. As most non-linear optical impairments are generated on the last coil of a multi-coil amplifier, the non-linear optical impairments can be minimized by optimizing the pumping configuration of last optical waveguide fiber amplifier 54 rather than each and every fiber amplifier of the multi-coil amplifier.

Figure 5:
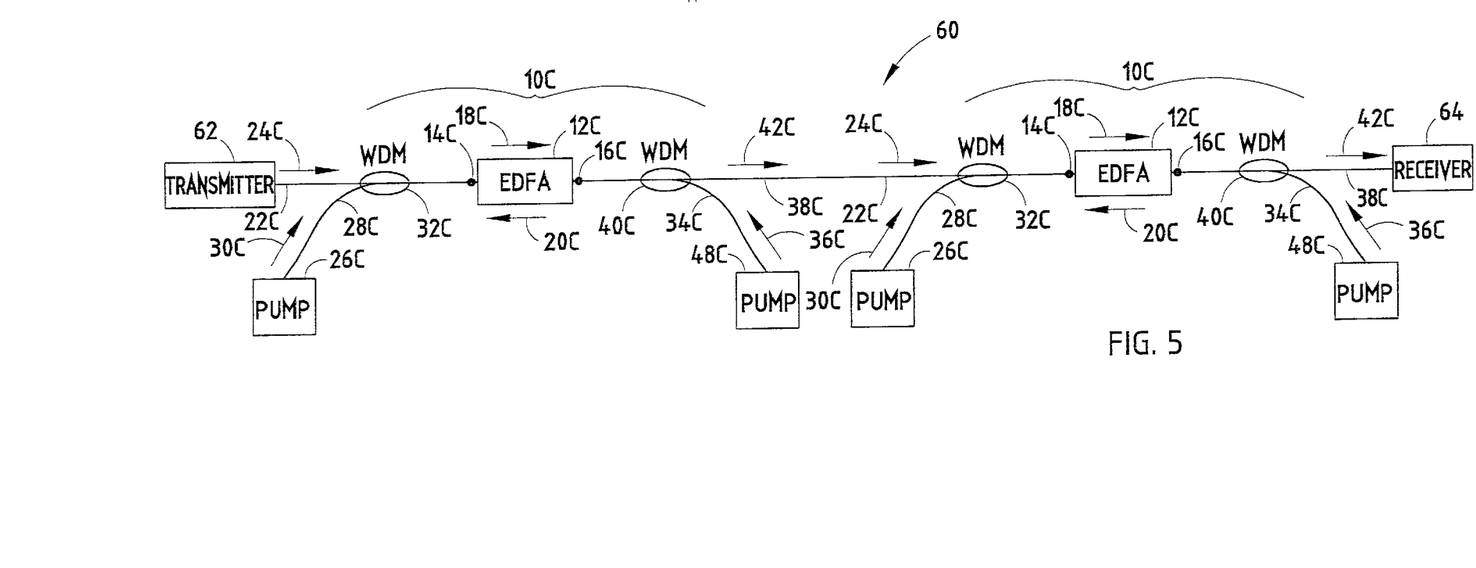
FIG. 5 is a schematic diagram of a telecommunication system including a transmitter, a receiver, and another examplanary optical amplifier of the present invention.

In accordance with the present invention, the optical waveguide amplifier 10 (or 10A or 10B) is constructed, configured, (see FIG. 5) and utilized in an optical communication system 60. (See FIG. 5) System 60 includes a transmitter 62 and a receiver 64 wherein transmitter 62 transmits and optical signal via optical fiber 22C to optical waveguide amplifier 10C (which can be configured the same as amplifiers 10, 10A or 10B), which is in turn received by receiver 64 after being amplified by optical waveguide amplifier 10C. It should also be noted that optical communication system 60 may include multiple fiber amplifiers 10C spaced apart connected in optical series so as to form separate stages of a multi-stage amplifier.

The configuration and method described above with respect to optical waveguide amplifier 10 mitigates the nonlinear optical impairments which develop within erbium-doped fiber amplifiers utilizing forward pumping configurations, while maximizing the optical signal to noise ratio by minimizing the noise introduced into an amplified signal where rearward pumping amplifier configurations are utilized.

It will become apparent to those skilled in the art that various modifications to the preferred embodiment of the invention as described herein can be made without departing from the spirit or scope of the invention as defined in the appended claims.

The invention claimed is:

1. A method for amplifying an optical signal within an optical waveguide amplifier, comprising:

providing at least one optical waveguide amplifier having an input end for receiving an optical source signal therein and an output end, wherein a forward pumping direction extends from the input end to the output end and a rearward pumping direction extends from the output end to the input end;

providing at least one excitation light source m optical communication with the optical waveguide amplifier and capable of generating at least one excitation light;

amplifying the source signal by pumping a first excitation light from the excitation light source in the rearward pumping direction; and amplifying the source signal by pumping a second excitation light from the excitation light source in the forward direction simultaneous with pumping the first excitation light wherein $|\Delta \text{OSNR}|<0.4$ dB and cross-talk contribution is $\square$−30 dB, where $\Delta \text{OSNR}= \text{OSNR}_{max}-\text{OSNR}$, $\text{OSNR}_{max}$ is the best achievable OSNR and OSNR stands for optical signal to noise ratio of the amplifier.

2. A method according to claim 1 wherein FWMX, <−40 dB, where FWMX is four wave mixing.

3. The method according to claim 2, wherein the step of providing at least one optical waveguide amplifier includes providing at least one optical waveguide fiber.

4. The method according to claim 3, wherein the step of providing at least one optical waveguide amplifier includes doping the optical waveguide fiber with erbium.

5. The method according to claim 4, wherein the step of providing at least one optical waveguide amplifier includes providing the optical waveguide fiber in the form of a coil.

6. The method according to claim 5, wherein (i) the step of providing at least one optical waveguide fiber includes providing a plurality of waveguide fibers in optical communication to form a multi-coil amplifier that includes at least a first waveguide fiber and a last waveguide fiber; and (ii) the step of amplifying the source signal with the first excitation light includes pumping the first excitation light into the last waveguide fiber; and (iii) the step of amplifying the source signal with the second excitation light includes pumping the second excitation light into the first waveguide fiber.

7. The method according to claim 5, wherein (i) the step of providing at least one optical waveguide amplifier includes: providing a plurality of waveguide fibers in optical communication to form a multi-stage amplifier that includes at least a first fiber amplifier and a last fiber amplifier and; (ii) the step of amplifying the source signal with the first excitation light includes pumping the first excitation light into the last fiber amplifier, and (iii) wherein the step of amplifying the source signal with the second excitation light includes pumping the second excitation light into the first fiber amplifier.

8. The method according to claim 1, wherein the step of providing at least one optical waveguide amplifier includes doping the optical waveguide fiber with erbium.

9. The method according to claim 1, wherein the step of providing at least one optical waveguide amplifier includes providing the optical waveguide fiber in the form of a coiled optical waveguide fiber.

10. The method according to claim 1, wherein (i) the optical waveguide amplifier providing step includes providing a plurality of waveguide fibers in optical communication to form a multi-coil amplifier that includes at least a first waveguide fiber and a last waveguide fiber, (ii) the step of amplifying the source signal with the first excitation light includes pumping the first excitation light into the last waveguide fiber, and (iii) the step of amplifying the source signal with the second excitation light includes pumping the second excitation light into the first waveguide fiber.

11. The method according to claim 1, wherein
(i) the optical waveguide amplifier providing step includes providing a plurality of waveguide fibers in optical communication to form a multi-stage amplifier that includes at least a first fiber amplifier and a last fiber amplifier,
(ii) the step of amplifying the source signal with the first excitation light includes pumping the first excitation light into the last fiber amplifier, and
(iii) the step of amplifying the source signal with the second excitation light includes pumping the second excitation light into the first fiber amplifier.

12. An optical waveguide amplifier having a forward pumping direction that extends from the input to the output and a rearward pumping direction that extends from the output to the input of said amplifier, said amplifier comprising:
at least one gain producing optical waveguide having an input for receiving an optical source signal therein and an output,
at least one excitation light source in optical communication with the optical waveguide, the excitation light source generating at least one excitation light; and
wherein the source signal is amplified by pumping (i) a first excitation light from the excitation light source into the optical waveguide in the rearward pumping direction, and (ii) a second excitation light from the excitation light source into the optical waveguide in the forward direction; and
wherein |ΔOSNR|<0.4 dB and FWMX □−25 dB, where OSNR stands for signal to noise ratio, and FWMX is four wave mixing cross talk.

13. An optical amplifier according to claim 12 wherein ΔOSNR<−0.4 dB and FWMX≦−30 dB.

14. The optical waveguide amplifier of claim 12, wherein at least one optical waveguide amplifier includes at least one optical waveguide fiber.

15. The optical waveguide amplifier of claim 14, wherein the optical waveguide fiber is doped with erbium.

16. The optical waveguide amplifier of claim 15, wherein the optical waveguide fiber is coiled.

17. The optical waveguide amplifier of claim 16, wherein at least one optical waveguide fiber includes a plurality of waveguide fibers in optical communication forming a multi-coil amplifier that includes at least a first waveguide fiber and a last waveguide fiber, the first excitation light is pumped into the last waveguide fiber, and wherein the second excitation light is pumped into the first waveguide fiber.

18. The optical waveguide amplifier of claim 16, wherein at least one optical waveguide fiber includes a plurality of waveguide fibers in optical communication forming a multi-stage amplifier that includes at least a first waveguide amplifier stage and a last waveguide amplifier stage, the first excitation light is pumped into the last waveguide amplifier stage, and wherein the second excitation light is pumped into the first waveguide amplifier stage.

19. The optical waveguide amplifier of claim 12, wherein the optical waveguide is doped with erbium.

20. The optical waveguide amplifier of claim 12, wherein the optical waveguide amplifier includes a coiled optical waveguide fiber.

21. The optical waveguide amplifier of claim 12, wherein the optical waveguide amplifier includes a plurality of optical waveguide fibers in optical communication with one another thereby forming a multi-coil amplifier that includes at least a first waveguide fiber and a last waveguide fiber, the first excitation light is pumped into the last waveguide fiber, and wherein the second excitation light is pumped into the first waveguide fiber.

22. The optical waveguide amplifier of claim 12, wherein at least one optical waveguide amplifier includes a plurality of waveguide fibers in optical communication with one another thereby forming a multi-stage amplifier that includes at least a first waveguide amplifier and a last waveguide amplifier, the first excitation light is pumped into the last waveguide amplifier, and wherein the second excitation light is pumped into the first waveguide amplifier.

23. The optical waveguide amplifier of claim 12 wherein $$1.3 < \frac{P_r}{P_f} < 20,$$

where $P_r$ is rearwardly propagating pump power and $P_f$ is forwardly propagating pump power.

24. An optical waveguide according to claim 12, wherein $$1.5 \leq \frac{P_r}{P_f} \leq 12.$$

25. An optical waveguide according to claim 12, wherein $$0 \leq \frac{\Delta OSNR}{\Delta P_r} \leq 4 dB.$$

26. An optical fiber communications system, comprising:
a transmitter adapted to transmit a source signal;
a receiver;
at least one optical waveguide amplifier having an input in optical communication with the transmitter for receiving the source signal and an output in optical communication with the receiver for delivering the source signal to the receiver, the optical waveguide amplifier having a forward pumping direction that extends from the input to the output and a rearward pumping direction that extends from the output to the input; and at least one excitation light source in optical communication with the optical waveguide amplifier, the excitation light source generating at least one excitation light; and wherein the source signal is amplified by pumping a first excitation light from the excitation light source into the optical waveguide amplifier in the rearward pumping direction, and wherein the source signal is amplified by pumping a second excitation light from the excitation light source into the optical waveguide amplifier in the forward direction and wherein $$1.5 < \frac{P_r}{P_f} < 12$$

and FWMX<−30 dB, where $P_r$ is rearwardly propagating pump power and $P_f$ is forward propagating pump power and FWMX is FWMX four wave mixing cross talk.

27. The optical communications system of claim 26, wherein at least one optical waveguide amplifier includes at least one optical waveguide fiber amplifier.

28. The optical communications system of claim 27, wherein the optical waveguide fiber amplifier is doped with erbium.

29. The optical communications system of claim 28, wherein the optical waveguide fiber amplifier is coiled.

30. The optical communications system of claim 29, wherein at least one optical waveguide fiber amplifier includes a plurality of waveguide fiber amplifiers in optical communication forming a multi-coil amplifier that includes at least a first waveguide fiber amplifier and a last waveguide fiber amplifier, the first excitation light is pumped into the last waveguide fiber amplifier, and wherein the second excitation light is pumped into the first waveguide fiber amplifier.

31. The optical communications system of claim 29, wherein at least one optical waveguide fiber amplifier includes a plurality of waveguide amplifiers in optical communication forming a multi-stage amplifier that includes at least a first waveguide amplifier and a last waveguide amplifier, the first excitation light is pumped into the last waveguide amplifier, and wherein the second excitation light is pumped into the first waveguide amplifier.

32. The optical communications system of claim 26, wherein the optical waveguide amplifier is doped with erbium.

33. The optical communications system of claim 26, wherein the optical waveguide amplifier includes a coiled optical waveguide fiber amplifier.

34. The optical communications system of claim 26, wherein the optical waveguide amplifier includes a plurality of optical waveguide fiber amplifiers in optical communication with one another thereby forming a multi-coil amplifier that includes at least a first waveguide fiber amplifier and a last waveguide fiber amplifier, the first excitation light is pumped into the last waveguide fiber amplifier, and wherein the second excitation light is pumped into the first waveguide fiber amplifier.

35. The optical communications system of claim 26, wherein at least one optical waveguide amplifier includes a plurality of waveguide amplifiers in optical communication with one another thereby forming a multi-stage amplifier that includes at least a first waveguide amplifier and a last waveguide amplifier, the first excitation light is pumped into the last waveguide amplifier, and wherein the second excitation light is pumped into the first waveguide amplifier.

36. The optical communications system of claim 26, further including:

a first optical waveguide fiber in optical communication with the transmitter and the optical waveguide amplifier, wherein the first optical waveguide fiber guides the source signal from the transmitter to the optical waveguide amplifier.

37. The optical communications system of claim 36, further including:

a second optical waveguide fiber in optical communication with the optical waveguide amplifier and the receiver, wherein the second optical waveguide fiber guides the source signal from the optical waveguide amplifier to the receiver.

38. A method for amplifying an optical signal within an optical waveguide amplifier, comprising:

providing at least one optical waveguide amplifier having an input end for receiving an optical source signal therein and an output end, wherein a forward pumping direction extends from the input end to the output end and a rearward pumping direction extends from the output end to the input end;

providing at least one excitation light source in optical communication with the optical waveguide amplifier and capable of generating at least one excitation light;

amplifying the source signal by pumping a first excitation light from the excitation light source in the rearward pumping direction; and amplifying the source signal by pumping a second excitation light from the excitation light source in the forward direction simultaneous with pumping the first excitation source, wherein $$0 \le \frac{\Delta OSNR(dB)}{\Delta P_r} \le 2dB.$$

and FWMX <−25 dB, where OSNR is optical signal to noise ratio, $\Delta P_r$ is pump power difference corresponding to pump power provided by said first excitation light, normalized to total pump power and, FWMX is cross talk due to four wave mixing cross talk.

39. A method for amplifying an optical signal within an optical waveguide amplifier, comprising:

providing at least one optical waveguide amplifier having an input end for receiving an optical source signal therein and an output end, wherein a forward pumping direction extends from the input end to the output end and a rearward pumping direction extends from the output end to the input end;

providing at least one excitation light source in optical communication with the optical waveguide amplifier and capable of generating at least one excitation light;

amplifying the source signal by pumping a first excitation light from the excitation light source in the rearward pumping direction; and amplifying the source signal by pumping a second excitation light from the excitation light source in the forward direction simultaneous with pumping the first excitation light, wherein $|OSNR_{max} - OSNR_{tot}| < 0.2$ dB, FWMX$\square$−40 dB, and $$1.5 \leq \frac{P_r}{P_f} \leq 12,$$

where $P_r$ is rearwardly propagating pump power and $P_f$ is forward propagating pump power, and wherein $\Delta OSNR = OSNR_{max} - OSNR$, where $OSNR_{max}$ is the best achievable OSNR, OSNR stands for optical signal to noise ratio and, FWMX is four wave mixing cross talk.

40. A method according to claim 39, wherein $$1.5 \leq \frac{P_r}{P_f} \leq 10.$$

41. An optical waveguide amplifier, comprising:
at least one gain producing optical waveguide having an input for receiving an optical source signal therein and an output, the optical waveguide amplifier having a forward pumping direction that extends from the input to the output and a rearward pumping direction that extends from the output to the input;
at least one excitation light source in optical communication with the optical waveguide, the excitation light source generating at least one excitation light; and
wherein the source signal is amplified by pumping (i) a first excitation light from the excitation light source into the optical waveguide in the rearward pumping direction, and (ii) a second excitation light from the excitation light source into the optical waveguide amplifier in the forward direction; and
wherein OSNR slope is less than 30°, where OSNR stands for optical signal to noise ratio, so that there is less than 0.4 dB change of OSNR per change in $\Delta P_r$ of 0.1, where $P_r$ is pump power provided by said first excitation source.

42. The optical waveguide according to claim 41, wherein OSNR slope is less than 15°, so that there is less than 0.2 dB change in ONSr per 0.1 change in $\Delta P_r$.

43. The optical wave guide amplifier according to claim 41, wherein said optical fiber amplifier is a multistage amplifier that includes at least a first stage and a rear stage, wherein said rear stage is being pumped directly, without first going through any other stage, by forward and rearward propagating pump radiation.

* * * * *

UNITED STATES PATENT AND TRADEMARK OFFICE
CERTIFICATE OF CORRECTION

PATENT NO.     : 6,643,057 B2
DATED          : November 4, 2003
INVENTOR(S)    : Vasilyev et al.

It is certified that error appears in the above-identified patent and that said Letters Patent is hereby corrected as shown below:

Column 2,
Line 62, insert:
-- According to an embodiment of the present inventor an optical waveguide amplifier the OSNR slope of the optical amplifier is less than 30º, where and OSNR stands for optical signal to noise ratio, so that there is less change than 0.4dB of OSNR per change in $\Delta P_r$ of 0.1 and $P_r$ is pump power provided by the first excitation light. --

Column 6,
Line 1, "$2.0 \leqq P_r / P_f \leqq 10$" should be -- $-2.0 \leq P_r / P_f \leq 10$ --.

Column 8,
Line 29, "m" should be -- in --.

Signed and Sealed this

Thirteenth Day of April, 2004

JON W. DUDAS
*Acting Director of the United States Patent and Trademark Office*